United States Patent
Cao et al.

(10) Patent No.: US 12,443,909 B2
(45) Date of Patent: Oct. 14, 2025

(54) SYSTEM FOR MODELING THE PERFORMANCE OF FULFILMENT MACHINES

(71) Applicant: INTERNATIONAL BUSINESS MACHINES CORPORATION, Armonk, NY (US)

(72) Inventors: Lei Cao, Worcester, MA (US); Brian Leo Quanz, Yorktown Heights, NY (US); Ajay Ashok Deshpande, White Plains, NY (US); Xuan Liu, Yorktown Heights, NY (US); Arun Hampapur, Norwalk, CT (US); Ali Koc, White Plains, NY (US); Yingjie Li, Chappaqua, NY (US); Yada Zhu, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 16/005,081

(22) Filed: Jun. 11, 2018

(65) Prior Publication Data
US 2019/0378061 A1    Dec. 12, 2019

(51) Int. Cl.
*G06Q 10/067*    (2023.01)
*G06F 30/20*    (2020.01)
(Continued)

(52) U.S. Cl.
CPC .......... *G06Q 10/067* (2013.01); *G06F 30/20* (2020.01); *G06N 3/08* (2013.01);
(Continued)

(58) Field of Classification Search
None
See application file for complete search history.

(56) References Cited

U.S. PATENT DOCUMENTS 6,721,762 B1    4/2004    Levine et al.
7,440,908 B2    10/2008    Snapp et al.
(Continued)

FOREIGN PATENT DOCUMENTS

WO    03/75195 A2    9/2003
WO    2011/085500 A1    7/2011
(Continued)

OTHER PUBLICATIONS

Schulte, M.J., et al. "A variable-precision interval arithmetic processor." Proceedings of IEEE International Conference on Application Specific Array Processors (ASSAP'94), pp. 248-258. (Year: 1994).*

(Continued)

*Primary Examiner* — Mehmet Yesildag
(74) *Attorney, Agent, or Firm* — CHIP LAW GROUP

(57) ABSTRACT

A computer implemented method and system of evaluating a fulfillment strategy in an omnichannel distribution system is provided. Input parameters are received from a computing device of a user. Historical data related to a network of nodes is received from a data repository. A synthetic demand status is determined based on the historical data and the input parameters. A synthetic network status based on the historical data and the input parameters are determined. A fulfillment strategy is identified based on the synthetic demand status and the synthetic network status. Key performance indicators (KPIs) for the fulfillment strategy are determined based on the synthetic demand status and the synthetic network status.

18 Claims, 8 Drawing Sheets

(51) Int. Cl.
*G06N 3/08* (2023.01)
*G06Q 10/0631* (2023.01)
*G06Q 10/0637* (2023.01)
*G06Q 10/0639* (2023.01)

(52) U.S. Cl.
CPC . *G06Q 10/06315* (2013.01); *G06Q 10/06375* (2013.01); *G06Q 10/06393* (2013.01)

(56) References Cited

U.S. PATENT DOCUMENTS

| | | |
|---|---|---|
| 7,996,204 B2 | 8/2011 | Hardwick et al. |
| 8,386,298 B2 | 2/2013 | Bai et al. |
| 8,682,751 B1 | 3/2014 | Antony |
| 8,972,564 B1 | 3/2015 | Allen |
| 9,142,035 B1 | 9/2015 | Rotman et al. |
| 9,213,953 B1 | 12/2015 | Kassmann et al. |
| 9,230,233 B1 | 1/2016 | Sundaresan et al. |
| 9,336,302 B1 | 5/2016 | Swamy |
| 9,501,613 B1 | 11/2016 | Hanson et al. |
| 11,301,791 B2 | 4/2022 | Zhu et al. |
| 11,301,794 B2 | 4/2022 | Zhu et al. |
| 2003/0061125 A1 | 3/2003 | Hoffman et al. |
| 2007/0087756 A1 | 4/2007 | Hoffberg |
| 2008/0028409 A1 | 1/2008 | Cherkasova |
| 2008/0288312 A1 | 11/2008 | Miles et al. |
| 2008/0306785 A1* | 12/2008 | Schuler .................. G06Q 10/08 705/7.37 |
| 2009/0006164 A1 | 1/2009 | Kaiser et al. |
| 2009/0089150 A1 | 4/2009 | Lee et al. |
| 2009/0099935 A1 | 4/2009 | Hamzy et al. |
| 2010/0317420 A1 | 12/2010 | Hoffberg |
| 2011/0054869 A1 | 3/2011 | Li |
| 2011/0307438 A1 | 12/2011 | Martinez |
| 2012/0072423 A1 | 3/2012 | Morrison |
| 2012/0078675 A1 | 3/2012 | McNeill et al. |
| 2012/0317059 A1 | 12/2012 | Joshi |
| 2013/0060712 A1 | 3/2013 | Esmaili et al. |
| 2013/0144763 A1 | 6/2013 | Skyberg et al. |
| 2013/0232028 A1 | 9/2013 | Spremulli |
| 2013/0246986 A1 | 9/2013 | Kuo et al. |
| 2014/0052677 A1 | 2/2014 | Wagner |
| 2014/0172735 A1 | 6/2014 | Jena et al. |
| 2014/0172736 A1 | 6/2014 | Saha |
| 2015/0120368 A1 | 4/2015 | Agrawal et al. |
| 2015/0186819 A1 | 7/2015 | Patel |
| 2015/0363843 A1 | 12/2015 | Loppatto et al. |
| 2015/0379430 A1 | 12/2015 | Dirac |
| 2016/0055452 A1 | 2/2016 | Qin |
| 2016/0063419 A1 | 3/2016 | Martinez et al. |
| 2016/0110681 A1* | 4/2016 | Brereton .............. G06Q 10/087 705/28 |
| 2016/0110735 A1 | 4/2016 | Brereton et al. |
| 2016/0140589 A1 | 5/2016 | Deshpande et al. |
| 2016/0328674 A1 | 11/2016 | Tripathi et al. |
| 2016/0328781 A1 | 11/2016 | Patel-Zellinger et al. |
| 2017/0032016 A1 | 2/2017 | Zinner |
| 2017/0161614 A1* | 6/2017 | Mehta .................... G06N 20/00 |
| 2017/0206541 A1 | 7/2017 | Deshpande et al. |
| 2017/0206589 A1 | 7/2017 | Deshpande et al. |
| 2017/0323250 A1 | 11/2017 | Lindbo et al. |
| 2018/0075401 A1 | 3/2018 | Harsha et al. |
| 2018/0137415 A1 | 5/2018 | Steinberg et al. |
| 2018/0260736 A1* | 9/2018 | Yates ...................... G06N 5/04 |

FOREIGN PATENT DOCUMENTS

WO 2016/039724 A1 3/2016
WO WO-2017217957 A1 * 12/2017 ............. G06F 30/28

OTHER PUBLICATIONS

List of IBM Patents or Applications Treated as Related.
Stefanovic, N., "Proactive Supply Chain Performance Management with Predictive Analytics"; The Scientific World Journal Volume (2014), 20 pgs.; University of Kragujevac; Kragujevac, Serbia.
Sheikholeslami, R. et al., "Progressive Latin Hypercube Sampling: An Efficient Approach for Robust Sampling-Based Analysis of Environmental Models"; Environmental Modelling and Software (2017); vol. 93; pp. 109-126.
Cioppa et al. Efficient Nearly Orthogonal and Space-Filling Latin Hypercubes, Technometrics, Feb. 2007, pp. 45-55, vol. 49, Issue No. 1.
Gao et al. "Real-Time Omnichannel Fulfillment Optimization", SSRN Electronic Journal, Jun. 2023, 75 pages.
Khare Tushar. "Optimization of Warehouse Cost & Workforce Forecasting", NEC, Oct. 26, 2015, 8 pages.
Labor Optimization in the New "Everywhere Commerce" Retail World; Manhattan Associates, (2013); 5 pgs.
Mell P. et al., "The NIST Definition of Cloud Computing"; National Institute of Standards and Technology, Gaithersburg, MD USA (2011) 7 pgs.
Rumsey Deborah J. "How Sample Size Affects Standard Error." From the book "Statistics for Dummies, 2nd Edition." Last Updated on Mar. 26, 2016. Retrieved from {URL: https://www.dummies.com/article/academics-the-arts/math/statistics/how-sample-size-affects-standard-error-169850}. (Year: 2016), 5 pages.

* cited by examiner

| Order No. 302 | Order Line No. 304 | Order Creation Time 306 | Order Process Time 308 | Source Zip Code 310 | Dest. Zip Code 312 | Fulfilm. Node 314 | Unit 316 | Carrier Mode 318 | Shipping Cost 320 | SLA 322 |

SYSTEM FOR MODELING THE PERFORMANCE OF FULFILMENT MACHINES

BACKGROUND

Technical Field

The present disclosure generally relates to simulators, and more particularly, to modeling behavior of a networked system.

Description of the Related Art

Today, retailers use a larger number and different types of nodes to distribute and position their inventory, by way of allocation planning. In some scenarios, an omnichannel supply chain model is used for a central stock pool to control various factors, such as fulfillment, pricing, sales, ordering, and stock management. Omnichannel retailing provides a seamless customer experience across all possible touch points and locations for a product, including brick stores, catalogs, online, mobile, and social. To maintain such experience at a low cost to the retailer, optimization based fulfillment strategies have emerged in the market. Such strategies model fulfillment into a multi-dimensional optimization problem by taking into account various factors that contribute to the fulfillment costs. These fulfillment strategies offer retailers an opportunity to reduce the fulfillment cost.

SUMMARY

According to various exemplary embodiments, a computing device, a non-transitory computer readable storage medium, and a computer implemented method of evaluating a fulfillment strategy in an omnichannel distribution system are provided. Input parameters are received from a computing device of a user. Historical data related to a network of nodes is received from a data repository. A synthetic demand status is determined based on the historical data and the input parameters. A synthetic network status based on the historical data and the input parameters are determined. A fulfillment strategy is identified based on the synthetic demand status and the synthetic network status. Key performance indicators (KPIs) for the fulfillment strategy are determined based on the synthetic demand status and the synthetic network status.

In one embodiment, the historical data includes raw demand data of one or more products offered by the network of nodes, and raw node data of each node in the network of nodes. The synthetic demand status is based on the raw demand data and the synthetic network status is based on the raw node data.

In one embodiment, the input parameters include one or more parameters that are related to a demand of one or more products in the network of nodes and one or more parameters that are related to a status of the network of nodes.

In one embodiment, identifying the synthetic demand status includes, for each order in the historic demand data, categorizing the order into one or more predetermined order categories, identifying one or more order categories that most closely coincide with one or more input parameters of the input parameters that relate to demand data, and generating synthetic demand data based on the identified one or more order categories and the input parameters that relate to demand data.

In one embodiment, identifying the synthetic network status includes, for each fulfillment information in the historic demand data, categorizing the fulfillment information into one or more predetermined fulfillment categories, identifying one or more fulfillment categories that most closely coincide with one or more input parameters of the input parameters that relate to fulfillment data, and generating synthetic network data based on the identified one or more fulfillment categories and the input parameters that relate to the fulfillment data.

In one embodiment, determining the KPIs for the fulfillment strategy includes applying a liner model to determine KPIs of the fulfillment strategy, upon determining that an R-squared score of the linear model is not above a predetermined first threshold, applying a logistic regression model to determine the KPIs of the fulfillment strategy, and upon determining that an R-squared score of the logistic regression model is below a predetermined second threshold, applying a neural network model to determine the KPIs of the fulfillment strategy.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 illustrates an example format of a fulfillment of an order, as it is stored in an order repository.

DETAILED DESCRIPTION

Figure 1:
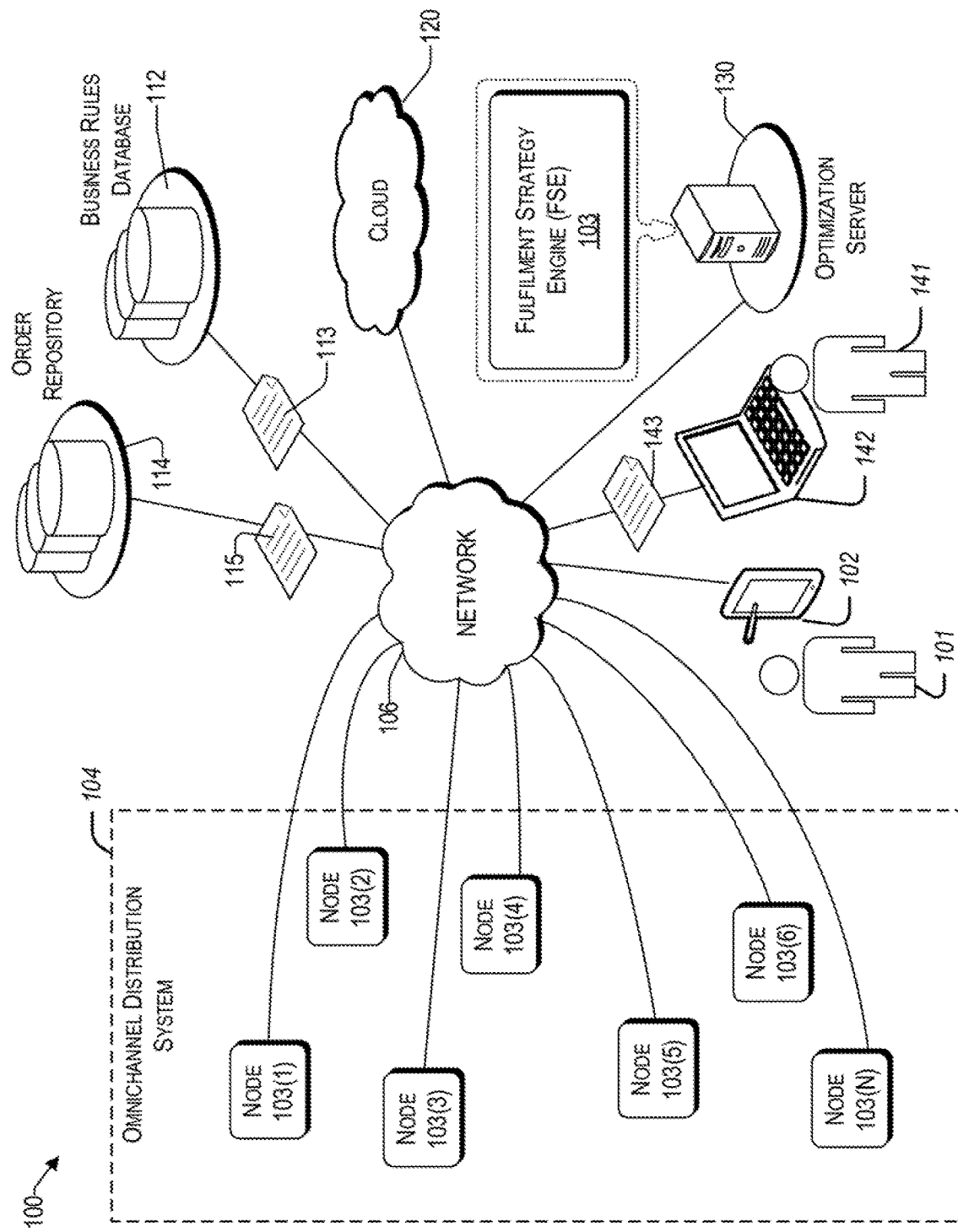
FIG. 1 illustrates an example architecture that may be used to implement a system for modeling a fulfillment strategy.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to modeling the behavior of a networked system having a plurality of nodes. As used herein, a node is a retail store, warehouse, fulfillment center, clearance center, and the like. In view of the increasing competition from online retailers, and for enabling an omnichannel customer experience, retailers have begun using different options, such as ship from store, same day delivery, ship from various locations, and/or buy online and pickup in store. Such flexible approach involves many variables for a computing system to accommodate. To create an omnichannel experience, retailers strive to meet different competing business objectives such as minimizing shipping costs, avoiding markdowns, maximizing customer satisfaction, and reducing workloads at the nodes of the retail enterprise.

Today, retail chains offer a plethora of products that are to be distributed via different nodes and locations. Predictions of life-cycle demand are typically noisy in that it they are prone to a relatively high error. Simply allocating to mean demand predictions can inordinately increase ecommerce fulfillment cost and lost store sales over the selling season of a product. There are incremental costs incurred due to over-allocating at a location (e.g., excess inventory occupies space, prices are marked down, fulfilling long-distance ecommerce orders can be expensive, labor costs increase with increased shipments, etc.) as well as due to under-allocating (e.g., lost brick sales opportunities). The challenge for a retail chain may be to determine how to allocate a product over various nodes such that the supply adequately meets demand at the lowest cost to the retailer and without lost sales. This allocation may also be executed periodically to allocate any remaining unallocated inventory in the warehouses or distribution centers.

The teachings herein provide a computerized system that is configured to evaluate and compare the performance of different fulfillment strategies in a virtual simulated environment. To that end, input parameters are received from a computing device of a user. Historical data related to a network of nodes (for a predetermined period) is received, from a data repository. A synthetic demand status and a synthetic network status are identified based on the historical data and the input parameters. Key performance indicators are then determined for a subject fulfillment strategy, based on the synthetic demand status and the synthetic network status.

The simulation of the fulfillment strategy can be used to play out how the fulfillment strategy would have acted under different scenarios and settings and the final output key performance indicators that would have resulted—even if the fulfillment strategy was never used with those settings in the real world. Accordingly, there may be no real data resulting from a particular set of settings or a scenario for a fulfillment strategy (for example such settings and scenario could be when the units per order is fewer than three and the shipping cost is given equal weight with capacity utilization cost in the fulfillment optimization objective). Nonetheless, the teachings herein provide for a determination of the results by simulating the e-commerce orders and the fulfillment decisions for those orders the fulfillment strategy would have made—and then computes the key performance indicators from the results, thereby building up data that can be used for modeling the performance of the fulfillment strategy. Such approach provides more complete data for modeling the relationships between the inputs and outputs.

By virtue of the teachings herein, the computerized system can create various prospective fulfillment models that can accurately forecast different scenarios, identify weak points in the parameters of each node for each scenario that can be improved through process redesign and/or reengineering, and more accurately calculate the parameters of each node and the fulfillment strategy. The architecture improves computational efficiency by reducing the samples in its memory to ones that are deemed to be more relevant for the calculations to be performed. Reference now is made in detail to the examples illustrated in the accompanying drawings and discussed below.

FIG. 1 illustrates an example architecture 100 that may be used to implement a system for modeling a fulfillment strategy. Architecture 100 includes an omnichannel distribution system 104 creating a network of nodes 103(1) to 103(N) that may be used to distribute various products. The nodes of the omnichannel distribution system 104 may include various brick and mortar stores that may be at different locations, referred to herein as zones. For example, node 103(1) may be in New York, while node 102(2) may be in Los Angeles. In various embodiments, the zones may be based at different levels of granularity and may overlap, such as countries, regions, states, zip codes, or a particular address.

The omnichannel distribution system 104 may include one or more warehouses, where products may be received from various manufacturers. For example, node 103(2) may be a warehouse that is used as a preliminary repository for a product that can then be distributed to secondary nodes, such as brick and mortar stores 103(1) and 103(2), or e-commerce warehouses 103(4), sometimes referred to as e-fulfillment centers. Such e-fulfillment centers may be distributed in various zones to accommodate online (or catalogue) orders from users via their computing device, represented herein by customer 101 and their computing device 102.

In the omnichannel distribution system 104, a brick and mortar store, such as store 103(1), can accommodate both walk-in customers and e-commerce customers, who may be far away from the store 103(1) using a retailer initiated ship-from-store fulfillment. Accordingly, store inventory can be used to satisfy both store demand and online demand. On the other hand, warehouses and/or e-fulfillment centers have no-walk in customers and cater predominantly to online demand.

To reduce fulfillment cost and provide better customer service, an e-fulfillment center is ideally located within a convenient shipping distance from the purchase destination of a product that has been ordered online by way of a computing 102 of a customer 101. The omnichannel distribution system 104 shares inventory for a product to maximize revenue and reduce order fulfillment cost.

Each node (103(1) to 103(N)) in the omnichannel distribution system 104 generates raw data, that may include sales and lost sales data, such as the order number, order line number stock keeping unit (SKU) number, and/or other data, discussed in more detail later. This raw data may be provided to an appropriate recipient, such as an order repository 114 or the optimization server 130, over the network 106. The raw data may be received from the nodes 103(1) to 103(N) at predetermined intervals (e.g., weekly, monthly, etc.), upon a trigger event (e.g., a threshold number of the product were sold), or upon request from the optimization server 116.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with an order repository 114. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The order repository 114 is configured to store historical data related to orders and fulfillment by way of the omnichannel distribution system 104 (sometimes referred to herein as a network of nodes) for different time periods. Accordingly, historical data may include raw data regarding orders, which may be received from user devices (e.g., 102) at a time of order (e.g., both electronic orders from online orders, as well as sales in stores). Historical data may also include node network status data, which may be received from the network of nodes 103(1) to 103(N). The historical data 115 of the order repository 114 can be provided to the optimization server 130 at predetermined intervals or upon a trigger event (e.g., request from the optimization server 130).

The architecture 100 may include a business rules database 112 that has stored therein service level agreements (SLAs) that define commitments that prevail between a service provider associated with the network of nodes 103(1) to 103(N) and an account of the customer 101. The business rules database 112 can provide the SLA 113 such that it is coupled with each order of a customer 101. The SLA 113 may also be used by the optimization server 130 to interpret an SLA code provided in the context of an order.

The architecture 100 includes a fulfillment strategy engine (FSE) 103, which is a program that runs on the optimization server 130. The FSE 103 is configured to receive historical data 115 from the order repository 114, input parameters from a user (sometimes referred to herein as a user) 141 via their computing device 142, and business rules 113 from the business rules database 112. In various embodiments, input parameters may be received in a single data packet or over several data packets by way of interactive communication between the FSE 103 and the computing device 142.

Based on the historical data 115 and the input parameters 143, the FSE 103 is configured to identify a synthetic demand and a synthetic node network status, which together provide a synthetic scenario, discussed in more detail later. This synthetic scenario can be used to determine prospective key performance indicators (KPIs) of different fulfillment strategies. In this way, different fulfillment strategies can be evaluated and provided on a user interface of the computing device 142 of the user 141.

In one embodiment, machine learning may be used by the FSE 103 to learn from the historical data 115 to develop the synthetic scenario. Machine learning is used herein to construct algorithms that can learn from and make predictions based on the historical data 115 stored in the order repository. Such algorithms operate by building a model from stored prior inputs or baselines therefrom to make data-driven predictions or decisions (or to provide threshold conditions to indicate a demand data and/or network status data), rather than following strictly static criteria.

Based on the machine learning, patterns, trends, and signatures that are consistent with the input parameters are identified from the historical data 115 to generate synthetic data therefrom that is consistent with the input parameters received from a computing device 142 (e.g., of a user 141). In various embodiments, the machine learning discussed herein may be supervised or unsupervised. In supervised learning, the FSE 103 may be presented with example historical data 115 from the order repository 114 as being representative of different conditions of the omnichannel distribution system 104 and/or the orders. Put differently, the historical data 115 acts as a teacher for the FSE 103. In unsupervised learning, the order repository 114 does not provide any labels as what is acceptable, rather, it simply provides raw historical data 115 to the FSE 103 that can be used together with the input parameters from the computing device 142 to find its own structure among the data. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

Further, in various embodiments, the FSE 103 is configured to perform predictive modeling using the synthetic scenario status, by way of different modeling approaches. For example, for a given fulfillment strategy, different models can be used to determine the performance of the fulfillment strategy. The accuracy of the generated linear model can be determined by various techniques, discussed in detail in a separate section.

For purposes of discussion, different computing devices (e.g., 102 and 142) appear in the drawing, to represent some examples of the devices that may be used to place orders, provide input parameters, receive various notifications from the FSE 103, etc. Today, computing devices typically take the form of tablet computers, laptops, desktops, personal digital assistants (PDAs), portable handsets, smart-phones, and smart watches, although they may be implemented in other form factors, including consumer, and business electronic devices.

While the order repository 114, business rules database 112, and optimization server 130 are illustrated by way of example to be on different platforms, in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. Thus, the functionality described herein with respect to each of the order repository 114, business rules database 112, and optimization server 130 can also be provided by one or multiple different computing devices.

Figure 2:
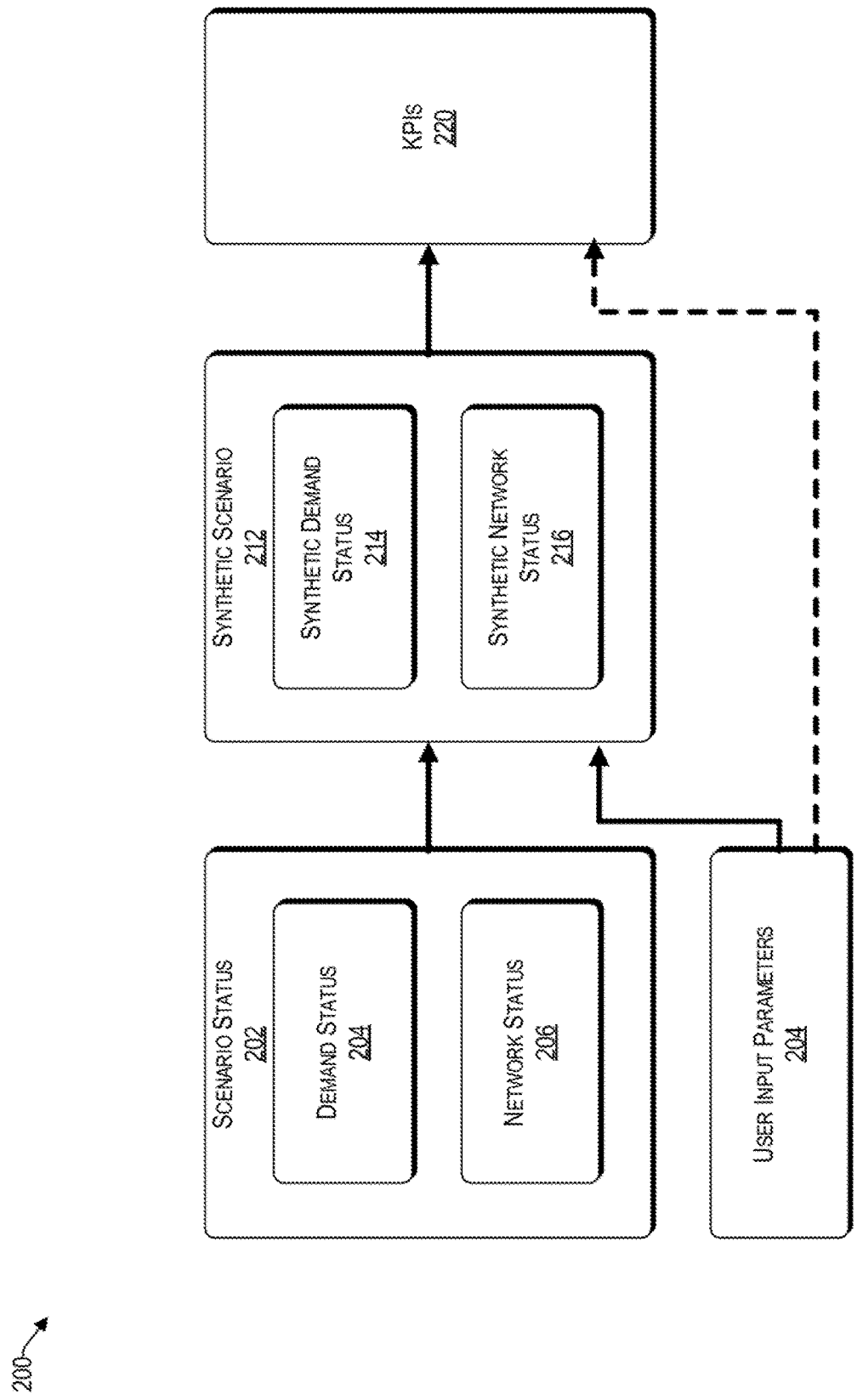
FIG. 2 is a block diagram of a system for modeling the key performance indicators of a fulfillment strategy for an omnichannel network of nodes, consistent with an illustrative embodiment.

FIG. 2 is a block diagram of a system 200 for modeling the KPIs of a fulfillment strategy for an omnichannel network of nodes, consistent with an illustrative embodiment. The scenario status 202 comprises the demand status 204 and the network status 206. For discussion purposes, the block diagram of FIG. 2 is described with reference to the architecture 100 of FIG. 1.

The demand status 204 represents raw data related to the orders of one or more products offered by the network of nodes of the omnichannel distribution system 104. Such data may include the order number, order line number, SKU number, order creation time, order process time, source location (e.g., ZIP), destination location (e.g., ZIP), fulfillment node, unit number, carrier mode, shipping cost, service level agreement (SLA) identification code or name, and the like. This raw order data is for a predetermined period (e.g., time, day, week, month, year, etc.) and is received by the order repository 114 for storage as demand status information 204.

The network status 206 represents raw data related to the condition of the network of nodes for the same predetermined period. This raw data of the node network includes a number of lines per package, weight of package, type of shipment, cost of shipment, number of shipments per order, buy quantity, prepack data, basket purchase information, proximity to transportation hub, labor cost, and the like. This raw data of the node network is also received by the order repository 114 for storage as network status information 206. In various embodiments, the demand status can be determined before, after, or concurrently with the network status.

The raw information provided by the scenario status 202 is retrospective and therefore may or may not provide the scenario envisioned by a user (e.g., by way of the user input parameters 204), which may describe a scenario that is prospective or different in other ways. For example, a user may be interested in different fulfillment strategies of a prospective scenario, such as a future super-bowl, presidential event, hypothetical natural phenomenon (e.g., heavy snow storm at a major distribution center). To that end, the demand status information 204 and the network status information 206 are used as a corpus of data to learn from and combined with the user input parameters to develop a synthetic scenario 212 that includes a synthetic demand status 214 and a synthetic network status 216.

More particularly, the raw data of the demand status information 204 is retrieved from the order repository 114 to create a synthetic demand status information 214 based on the user input parameters 204. Similarly, the raw data of the node network status information 206 is used to create the synthetic network status information 216 based on the user input parameters. In this way, a synthetic scenario 212 is created that accommodates the scenario envisioned by the user. The synthetic scenario can then be used by the FSE 103 to generate KPIs 220 for one or more fulfillment strategies.

In various embodiments, the input parameters may be received in a single data packet or may be provided interactively, represented by the dotted line 234. For example, to provide better computational efficiency and a more accurate result, the FSE 103 may provide different options to choose from, which are operative to reduce the volume of raw data to be evaluated. These options may be provided on a user interface of the computing device 142 of the user 141 (e.g., display). For example, the user may be prompted to select from different constraints (e.g., time of day, region, type of node, etc.) thereby better fine-tuning the scenario and conserving computing resources (i.e., by performing more focused calculations) to determine the KPIs 220.

The KPIs related to demand for a predetermined period may include one or more of the following: a number of orders, average lines per order, average units per order, average weight per order, percentage of different product categories, percentage of different number of order-line orders, percentage of orders from different regions, etc. The KPIs related to the network status may include on or more of the following: packages per order, cost per order, cost per package, end of day (EOD) backlog days, average shipping zones (e.g., the average number of zones traveled per package or per order to fulfil an order), average cost per order-line, average package per order-line, number/percentage of upgraded orders, number/percentage of delayed orders, etc. In one embodiment, the network status data, sometimes referred to herein as the fulfillment data, is stored in the order repository in a predetermined format to provide a common platform for categorization and/or comparison. In this regard, FIG. 3 illustrates an example format of an order line of an order, as it is stored in the order repository 114. In the example of FIG. 3, the order, which becomes part of the node information stored in the order repository 114, includes an order number 302, order line number 304, order creation time 306, order process time 308, source location (e.g., ZIP) 310, destination location (e.g., ZIP) 312, fulfillment node 314, unit number 316, carrier mode 318, shipping cost 320, and service level agreement (SLA) identification code or name 322. It should be noted that an order may include multiple order lines (e.g., corresponding to different items in the order), resulting in a same order number. Each line of an order can ship from (e.g., be fulfilled from) a different node.

As mentioned in the context of FIGS. 1 and 2, the FSE 103 is configured to generate a synthetic scenario based on received input parameters and historical data. This synthetic scenario includes a synthetic demand and a synthetic network status. In this regard, reference now is made to FIG. 4, which is a conceptual block diagram of the identification of a synthetic demand, consistent with an illustrative embodiment. The generation of a synthetic demand data includes more than one step, namely, (i) historical data analysis and (ii) synthetic demand data generation.

The historic raw data related to the orders of one or more products offered by a network of nodes, is represented by way of order data 1 to X (i.e., 402(1) to 402(X)). The FSE 103 classifies each order into an appropriate order category (e.g., 404(1) to 404(M)). In various embodiments, the categories 404(1) to 404(M) can be predetermined or based on user input (which may be interactive). For example, the categories may be based on a number of order lines, the number of units, the total weight of each order, the shipping zone between destination and origin, the shipping store, etc. Accordingly, orders with, for example, the same threshold number of order lines or units are clustered together into a same category by the FSE 103. Some orders can fall into multiple categories, as illustrated by way of order 3 (i.e., 402(3)), which falls into categories 1 and 2.

In some embodiments, the FSE 103 interactively communicates with the computing device 142 of the user 141 to display different settings to choose from, to further finetune the category selection process of the orders 1 to X. In some embodiments, the classification is based on permutations of the input parameter(s) from the user. For example, if the time of day is selected by the user, the categories may include different gradients of time, such as time of day, season, event, etc. Thus, the classification can be performed at different granularities (e.g., season, month, day, hour, etc.).

Figure 4:
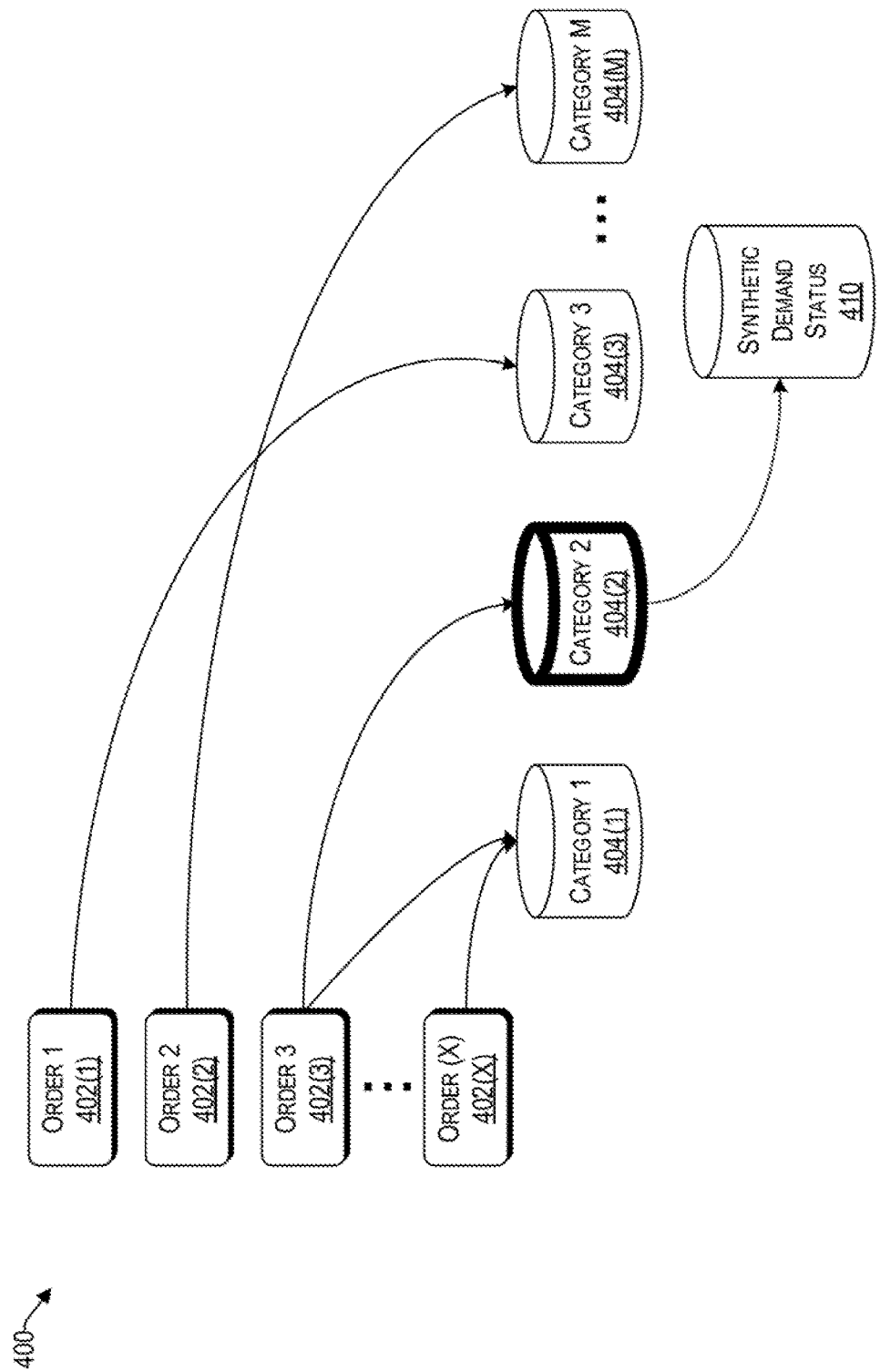
FIG. 4 is a conceptual block diagram of an identification of a synthetic demand, consistent with an illustrative embodiment.

The FSE 103 then identifies one or more categories that most closely coincide with the input parameters of the user, represented by way of example by category 2 (i.e., 404(2)) in FIG. 4. In some embodiments, the user is prompted with KPIs that a user can select from (i.e., to indicate KPIs that are relevant and those that are not). These selections become part of the user input from which the appropriate one or more categories are selected. Stated differently, the sample size of the data is limited to one or more relevant order categories.

Based on the raw demand status data that is in category 2 (304(2)), the FSE can develop a synthetic demand status 410 that better accommodates the input parameters from the user. This synthetic demand status 410 creates a synthetic demand scenario. For example, the input parameters from the user may include a number of orders, a number of different order line orders, a number of different unit orders, and a predetermined region (origin). If a user attempts to determine a workload of 200,000 orders at peak day, with 60% first order line orders, then the FSE engine refers to the categories 1 to M that most closely relate to this scenario. Based on the information in the identified one or more categories, synthetic data is created that better accommodates the scenario of the user.

Figure 5:
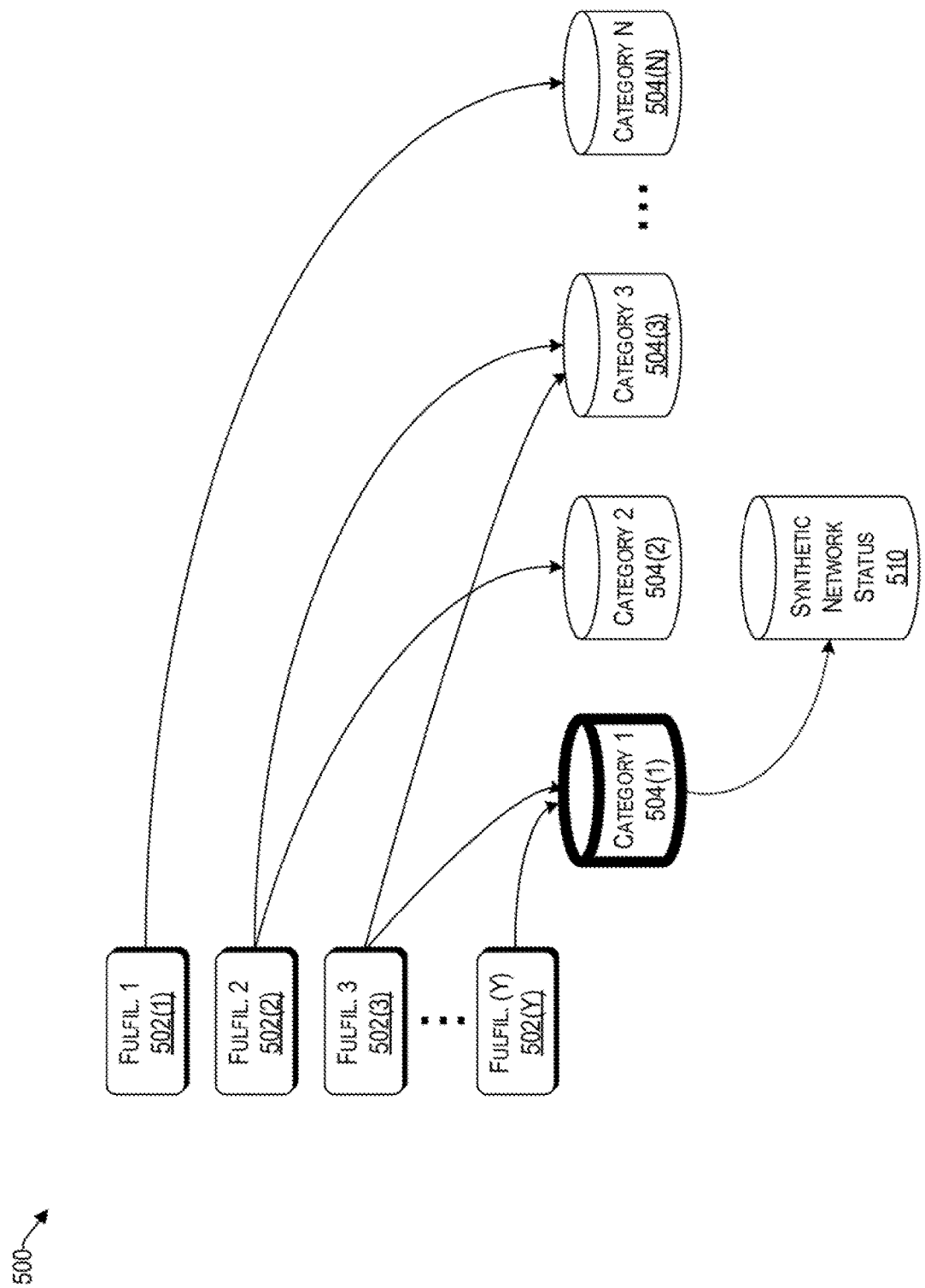
FIG. 5 is a conceptual block diagram of an identification of a synthetic network status, consistent with an illustrative embodiment.

Reference now is made to FIG. 5, which is a conceptual block diagram of an identification of a synthetic network status, consistent with an illustrative embodiment. Similar to the generation of a synthetic demand data, the generation of the synthetic network status includes (i) historic network status data analysis and (ii) synthetic network status data generation.

The historic raw data related to the nodes of the network of the omnichannel distribution system is represented by way of node data 1 to N (i.e., 502(1) to 502(Y)). The FSE 103 classifies the data received from each node into an appropriate fulfillment category (e.g., 504(1) to 504(N)). In various embodiments, the categories 504(1) to 504(N) can be predetermined or based on user input (which may be iterative by way of interactive communication between the user device and the FSE 103). For example, the categories may be based on beginning of day (BOD) backlog, node type, weight, shipping method, shipping rate card, processing capacity, cost of shipment, proximity to transportation hub, etc. Some nodes can fall into multiple categories, as illustrated by way of node 3 (i.e., 502(3)), which falls into categories 1 and 3.

In some embodiments, the FSE 103 interactively communicates with the computing device 142 of the user 141 to display different settings to choose from, to further finetune the category selection process of the orders 1 to N. These may include KPIs that a user can select from to indicate KPIs that are relevant and those that are not. In one embodiment, the user can select KPIs at different levels of granularity, including for particular nodes and time periods. These selections become part of the user input from which the appropriate one or more fulfillment categories are selected.

The classification may be based on permutations of the input parameter(s) from the user. The FSE 103 then identifies a category that most closely resembles the input parameters of the user, represented by way of example by category 1 (i.e., 504(1)) in FIG. 5. Stated differently, the sample size of the data for the network status data is limited to one or more relevant fulfillment categories that best match the scenario envisioned by the user. Based on the raw network status data that is in category 1 (504(1)), the FSE can develop a synthetic network status 510 that better accommodates the input parameters from the user.

The synthetic demand status of FIG. 4 and the synthetic network status of FIG. 5 together create a synthetic scenario that is used by the FSE to generate KPIs for one or more fulfillment strategies. In this way, different fulfillment strategies can be evaluated and provided to a user interface (e.g., display) of a computing device of a user. By virtue of limiting the raw data to one or more focused categories, the memory stack of the optimization server 130 is reduced, thereby reducing the computational resources required to process the synthetic demand status.

Referring back to FIG. 1, the synthetic scenario created by the FSE 103 based on the historical data 115 and the input parameters from the computing device 142 of a user 141, can be used to determine various KPIs that may be of interest to the user. For example, for an identified fulfillment strategy, if the user would like to predict the average packages per order (PPO) KPI for different workload scenarios having different average order lines per order (LPO), then the PPO and LPO parameters can be selected to be variables for a predictive regression model with the PPO as a criterion variable and LPO as the predictor variable. As used herein, the predictor variable is an independent variable that is used to predict an outcome (i.e., the criterion variable). The identified categories of the synthetic scenario, as discussed in the context of FIG. 2, can be used to provide the training data or to generate the training data via simulation to model how one or more factors influence the PPO in the given fulfillment strategy. For example, the FSE 103 can determine how units per order (UPO) and LPO correlate with PPO.

It should be noted that it is not necessarily just the historical cases in the categories themselves being used directly as training data—as this may not be a large pool of data and may not capture sufficient variation of the fulfillment strategy. Rather these categories can also be used to generate training data—given the categories that define the set of orders and network states that will be simulated—multiple realizations can be simulated for each category, and the fulfillment strategy is executed with varying settings or input scenarios (e.g., like the varying UPO or LPO in the demand picture as mentioned, or fulfillment strategy settings like the weight for shipping cost vs. network capacity utilization vs. markdown avoidance) in this simulation environment, and the results recorded. The KPI results, such as cost per order or PPO, are recorded for each different input setting. The training data then includes each input setting (like LPO or UPO) used in simulating the fulfillment results, and the KPIs of interest from the fulfillment results (e.g., PPO in this case). Accordingly, there are collections of examples of PPO for different LPO and UPO for that fulfillment strategy and that particular context the user wanted to characterize the strategy for (e.g., like peak season)—and this forms the training data. Accordingly, in one embodiment training data is not just based on historic data, but may also include synthetic data.

For example, even if the simulated orders (e.g., from the synthetic data) may be similar to historic cases, the FSE runs the actual fulfillment decision or optimization systems, potentially with different settings than were ever run before (i.e., never seen in the historic data). Accordingly, the results will be close to real for what they would have produced if they were run for real with those settings. Such approach provides useful key information about how a subject fulfillment strategy would perform. Thus, the FSE 103 can exercise the fulfillment strategy in ways it was never exercised in the real world, via simulation, and use the results of the simulation to create a better understanding of the relationship between its inputs (e.g., like LPO, UPO, objective weight settings, etc.) and the business outcome outputs (e.g., like cost per order and PPO).

Different predictive modeling approaches can be used. In one embodiment, linear regression model is used to theoretically compare the performance (e.g., KPIs) of different fulfillment strategies. For example, the format of equation 1 below can be used:

$$y = w_1 x_1 + w_2 x_2 + \ldots + w_i x_i + \ldots w_n x_n + b \quad \text{(Eq. 1)}$$

Where:
y is a criterion variable;
x is a predictor variable;

$w_i$ is the weight of the $i^{th}$ predictor variable in predicting the outcome y—describing the relationship of how the outcome increases or decreases as the predictor variable increases or decreases; and b is a constant representing a base level for the outcome y around which the values of y vary as the values of the predictor variables change.

In the present example, the UPO and LPO are x1 and x2, respectively, while the PPO is y. Parameters w1 and w2 indicate how quickly the PPO increases when LPO and UPO increase. This approach models, for example, how the fulfillment strategy scales to orders with a large number of order lines.

Different regression techniques, linear or otherwise, are supported by the FSE 103. The most appropriate algorithm (i.e., least computationally complex while providing a threshold level of accuracy) is selected based on the user's input parameters. For example, if the user is interested in whether the LPO and UPO have the same influence on the PPO, a least absolute shrinkage and selection operator (lasso) technique can be applied to automatically analyze the correlation between LPO and UPO in terms of the influence to PPO. Lasso is a regression analysis method that performs both variable selection and regularization in order to enhance the prediction accuracy and interpretability of the statistical model it produces. Additionally, different constraints and penalties can be added to the regression task to enforce the realism of the model and improve its accuracy. For example, the constraint that the packages per order must be 1 if the units per order is 1 (since a single unit can only ship in a single package), or penalties on the weight values $w_i$ to encourage smaller weight values and less extreme predictions (weight regularization).

The accuracy of the generated linear model can be determined in different ways. In one embodiment, an R-squared score may be used. R-squared is a statistical measure of how close the data are to a fitted regression line. A score of 0% indicates that the model explains none of the variability of the response data around its mean. In contrast, a score of 1 or 100% indicates that the model explains all the variability of the response data around its mean. For example, if the R-squared score is small (lower than 0.7—or 70%), it is indicative that the variables do not show a linear relationship. In this regard, more computationally complex non-linear modelling may be used, as discussed below.

In one embodiment, if the selected variables do not show a sufficient linear relationship, a logistic regression model (e.g., as a generalized linear model) is used to model the behavior of an identified fulfillment strategy. For example, logistic regression is used when the data follows a sigmoidal relationship, wherein, as the input values (x) increase further, the output values (y) increase but saturate towards a constant value. Stated differently, as x is increased, y continues to increase but increases progressively less, approaching a predetermined limit (e.g., 1), as x continues to grow. Similarly, as x decreases, y continues to decrease but decreases progressively less, towards another constant value. The expression for the logistic regression model is provided in equation 2 below:

$$y=1/(1+\exp(-w_1x_1-w_2x_2- \ldots -w_nx_n-b)) \quad \text{(Eq. 2)}$$

Where:

y is the criterion variable—appropriately normalized so that data values for y are mostly in the range of a sigmoid function—between 0 and 1;

x is a predictor variable;

$w_i$ is the weight of the $i^{th}$ predictor variable in predicting the outcome y—describing the relationship of how the outcome increases or decreases as the predictor variable increases or decreases—i.e., the rate of saturation for this predictor; and b is a constant representing the base level of saturation (or position) in the sigmoid function representing the skew of the data (when taken relative to the weights). For example a larger b value would indicate the y values are skewed more towards the normalized value of 1 and that the y values saturate closer to 1.

Again, parameters $x_1$ and $x_2$ can be the LPO and UPO as the predictor variables, while y can be the normalized PPO as the criterion variable y. Similar to the linear regression model, the logistic regression model represented by equation 2 above can be used to predict KPIs for different workloads with varying demand scenarios. In one embodiment, since the logistic regression model is not as intuitive, and thus more computationally complex than the linear regression model, the logistic regression model is used if the R-squared score is below a predetermined threshold (e.g., 0.7 or 70%), or other metrics and associated thresholds such as mean squared error or Pearson correlation coefficient. In one embodiment, an R-squared score can also be used to characterize the accuracy of the logistic regression model.

In one embodiment, if the FSE 103 determines that the performance of the fulfillment strategy cannot be modeled accurately with a linear model or a generalized linear model (e.g., the R-squared score is below a predetermined threshold), then a more complex non-linear model is used. For example, a neural network model can be used, which is based on simple mathematical models of the brain that allows complex nonlinear relationships between the response variable and its predictors. For example, the user provides some input parameters, such as the number of hidden layers and number of hidden nodes. Providing such input parameters may be not trivial for users without a deep machine learning background. Therefore, in one embodiment, the parameters of the neural network are determined automatically by holding out some of the training data, training the neural net with different parameters, and scoring each one on the held-out data—to select the parameters that resulted in the best score on the held-out data. Other forms of automatic model selection are possible as well. In another embodiment, a set of models corresponding to different scenarios are trained beforehand utilizing the historical data. Then, the user can provide the input parameters for their scenario to be simulated. In another example of a non-linear model, a basis-expansion model can be used wherein the input predictor variables are mapped to new predictor variables via non-linear functions, and a linear regression is preformed using the new predictor variables. For example, predictor $x_1$ might be mapped to the value $x_1*x_1$. This enables capturing and understanding non-linear relationships with the same linear regression techniques.

In one embodiment, due to the complexity of the neural network model, the user is prompted with additional parameters to eliminate (e.g., variables that are not deemed to be sufficiently correlated to the performance of the fulfillment strategy).

Accordingly, complex and computationally involved approaches are substantially avoided by the FSE unless the confidence in the result is below a predetermined threshold. Further, even if a more complex approach is used (e.g., neural networks), the parameters are further reduced. By virtue of using more computationally simple models initially, the computational resources of the FSE are conserved.

Figure 6:
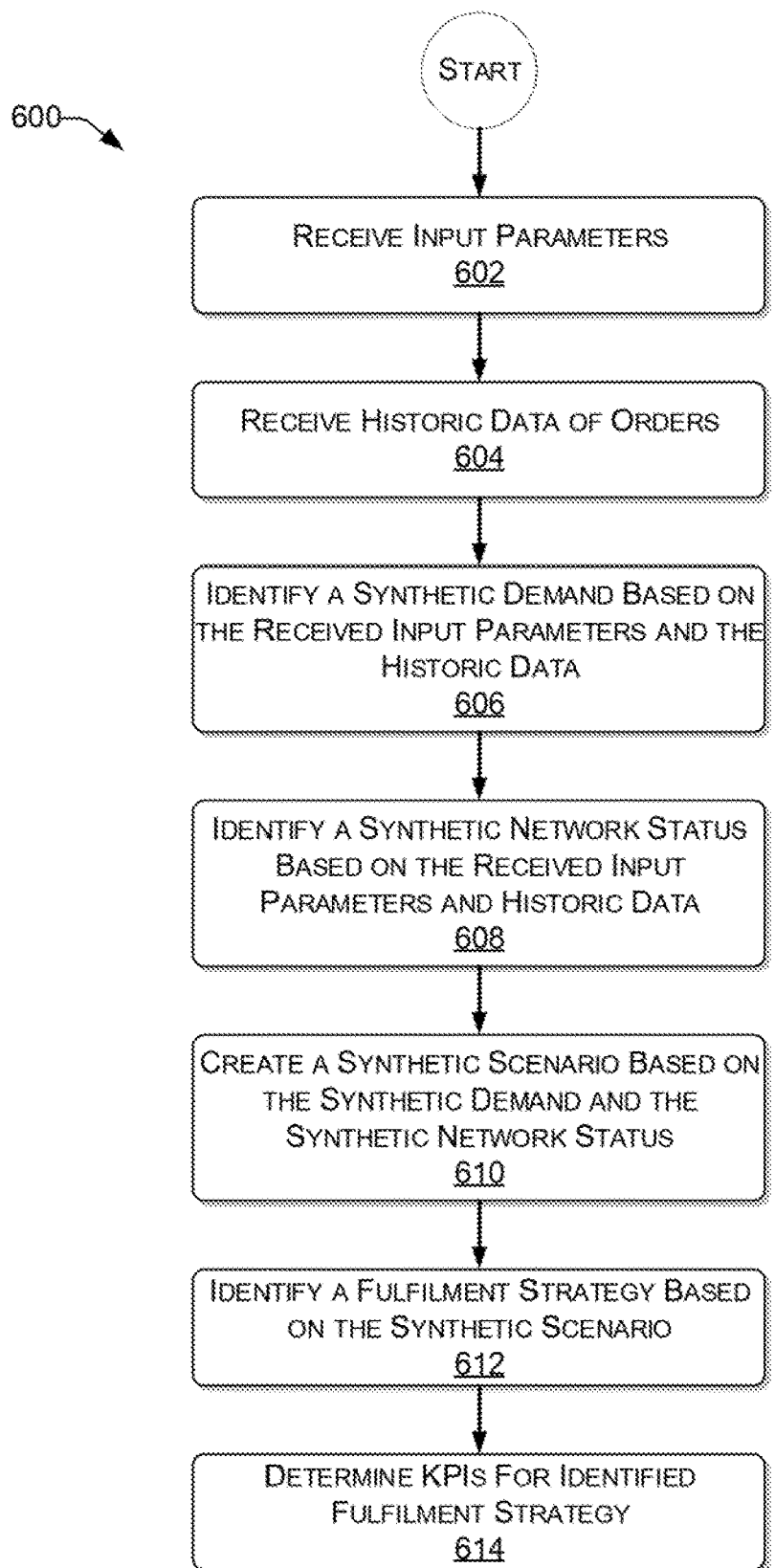
FIG. 6 presents a process for modeling fulfillment strategies for an omnichannel network of nodes.
Figure 7:
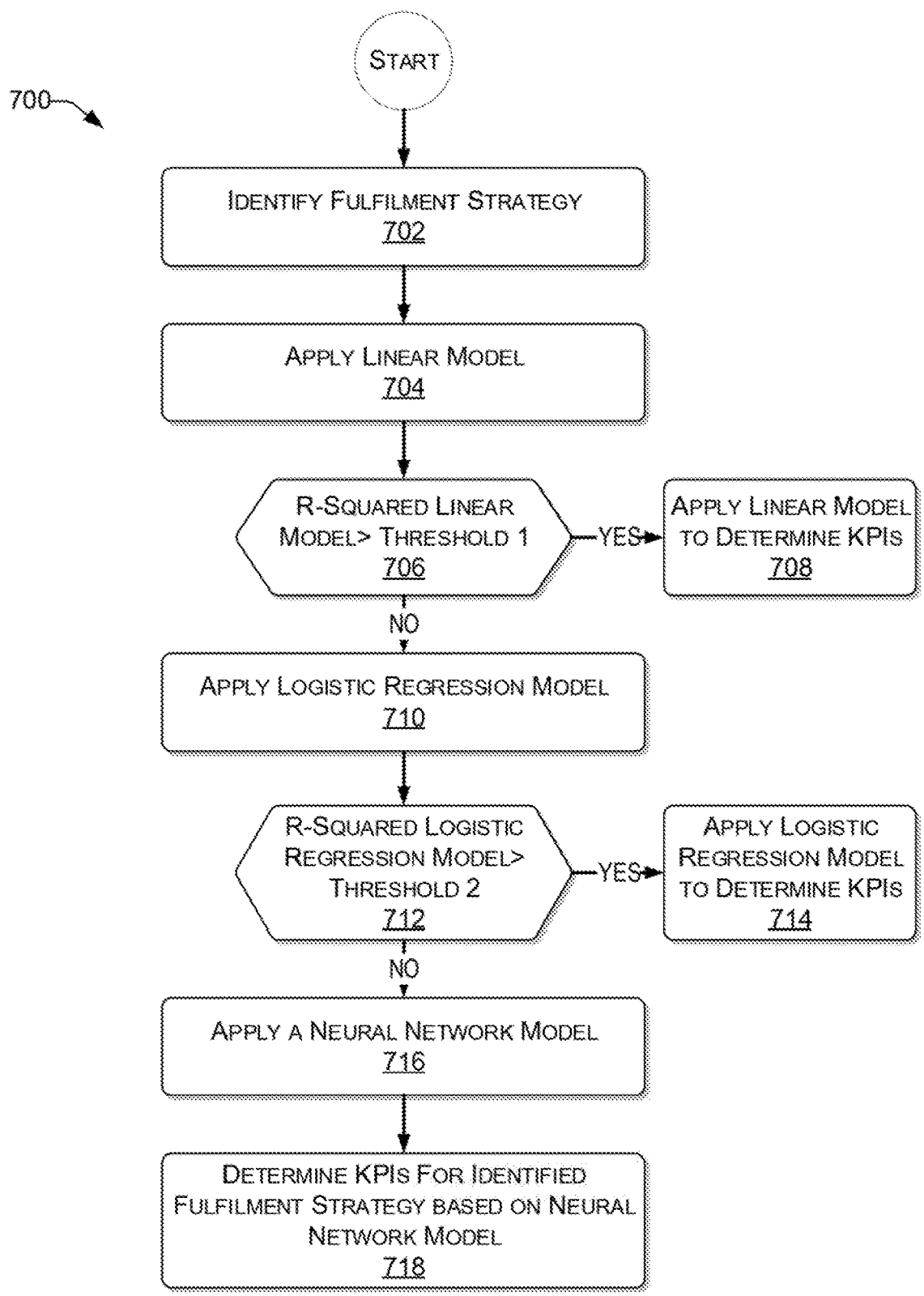
FIG. 7 illustrates an example process to identify the appropriate model to use for the determination of key performance indicators for different synthetic scenarios, consistent with an illustrative embodiment.

With the foregoing overview of the architecture 100 of a system for modelling a fulfillment strategy, and a discussion of a block diagram 200 for modeling the KPIs of a fulfillment strategy for omnichannel network of nodes, it may be helpful now to consider a high-level discussion of an example processes. To that end, FIGS. 6 and 7 present illustrative processes 600 and 700 for modeling fulfillment strategies for an omnichannel network of nodes. These processes may be performed by the FSE 103 of an optimization server 130. Processes 600 and 700 are illustrated as a collection of blocks in logical flowcharts, which each represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 600 and 700 are described with reference to the architecture 100 of FIG. 1.

At block 602, input parameters are received by the FSE 103 from the computing device 142 of a user 141. In some embodiments, the input parameters are not provided in a single data packet; rather, they are provided by way of iterative communication between the computing device and the FSE 103. For example, the user 141 may provide an initial set of parameters, which are iteratively finetuned by the FSE 103 asking interactive questions. The iterative communication may include the user being prompted various interactive forms, where the user can enter parameters or make binary selections from a list of options.

At block 604, historic order data 115 is received from an order repository 114 at predetermined intervals or upon a trigger event (e.g., in response to a request from the FSE 103). The historical data includes raw data of orders (i.e., demand data) of one or more products offered by the network of nodes 103(1) to 103(N) of the omnichannel distribution system 104. The historical data also includes raw data of performance parameters (i.e., network status data) of each node in the network of the omnichannel distribution system 104. In various embodiments, the raw demand data and the raw network status data may be received by the optimization server 130 separately or in the same data packet from the order repository 114.

At block 606, a synthetic demand is identified based on the received input parameters and the historical data. To that end, first, the raw demand data portion of the historical data 115 is categorized into one or more predetermined categories. One or more categories that most closely coincide with the received input parameters are identified. Next, synthetic demand data is then generated based on the identified one or more categories and the received input parameters.

At block 608, a synthetic network status is identified based on the received input parameters and the historical data. In one embodiment, the synthetic network status is identified based on steps that are similar to those of the identification of the synthetic demand of step 606. For example, the raw network status data of each node is categorized into one or more predetermined fulfillment categories. In one embodiment, these fulfillment categories are different from the categories used in the identification of the synthetic demand of step 606. Next, one or more fulfillment categories that most closely coincide with the received input parameters are identified. Next, synthetic network status data is generated based on the identified one or more fulfillment categories and the received input parameters.

At block 610, the synthetic demand and the synthetic network status are combined to create a synthetic scenario.

At block 612, a fulfillment strategy is identified based on the synthetic demand and the synthetic network status of the synthetic scenario.

At block 614, KPIs are determined based on predictive modeling based on the synthetic scenario and the received input parameters.

Reference now is made to FIG. 7, which illustrates an example process to identify the appropriate model to use for a determination of KPSs for different synthetic scenarios, consistent with an illustrative embodiment.

At block 702, a fulfillment strategy is identified by the FSE 103 that is of interest to a user, based on the input parameters provided therefrom.

At block 704, a linear model is used to determine the KPIs of the identified fulfillment strategy. In some embodiments, a subset (e.g., a single or more) KPI, referred to herein as one or more preliminary KPIs, are determined to first identify the accuracy of the linear model.

At block 706, the FSE 103 determines the R-squared score for the linear model based on the preliminary KPIs. If the R-squared score is above a first threshold (i.e., "YES" at decision block 706), the process continues with block 708, where the linear model is deemed appropriate and the KPIs are determined based on the linear model. However, upon determining that the R-squared score is not above the first threshold (i.e., "NO" at decision block 706), then the process continues with block 710, where a logistic regression model is applied.

At block 712, the FSE determines the R-squared score for the logistic regression model. If the R-squared score is above a second threshold (i.e., "YES" at decision block 712), the process continues with block 714, where the logistic regression model is deemed appropriate, and the KPIs are determined based on the same model. However, upon determining that the R-squared score is not above the second threshold (i.e., "NO" at decision block 712), then the process continues with block 716, where a neural network model is applied. In one embodiment, the first threshold and the second threshold are identical.

At block 718, the KPIs are determined for the identified fulfillment strategy based on a neural network model.

Accordingly, by virtue of using a most computationally simple model that provides sufficient accuracy, the FSE 103 conserves valuable computational resources of the optimization server 130.

Figure 8:
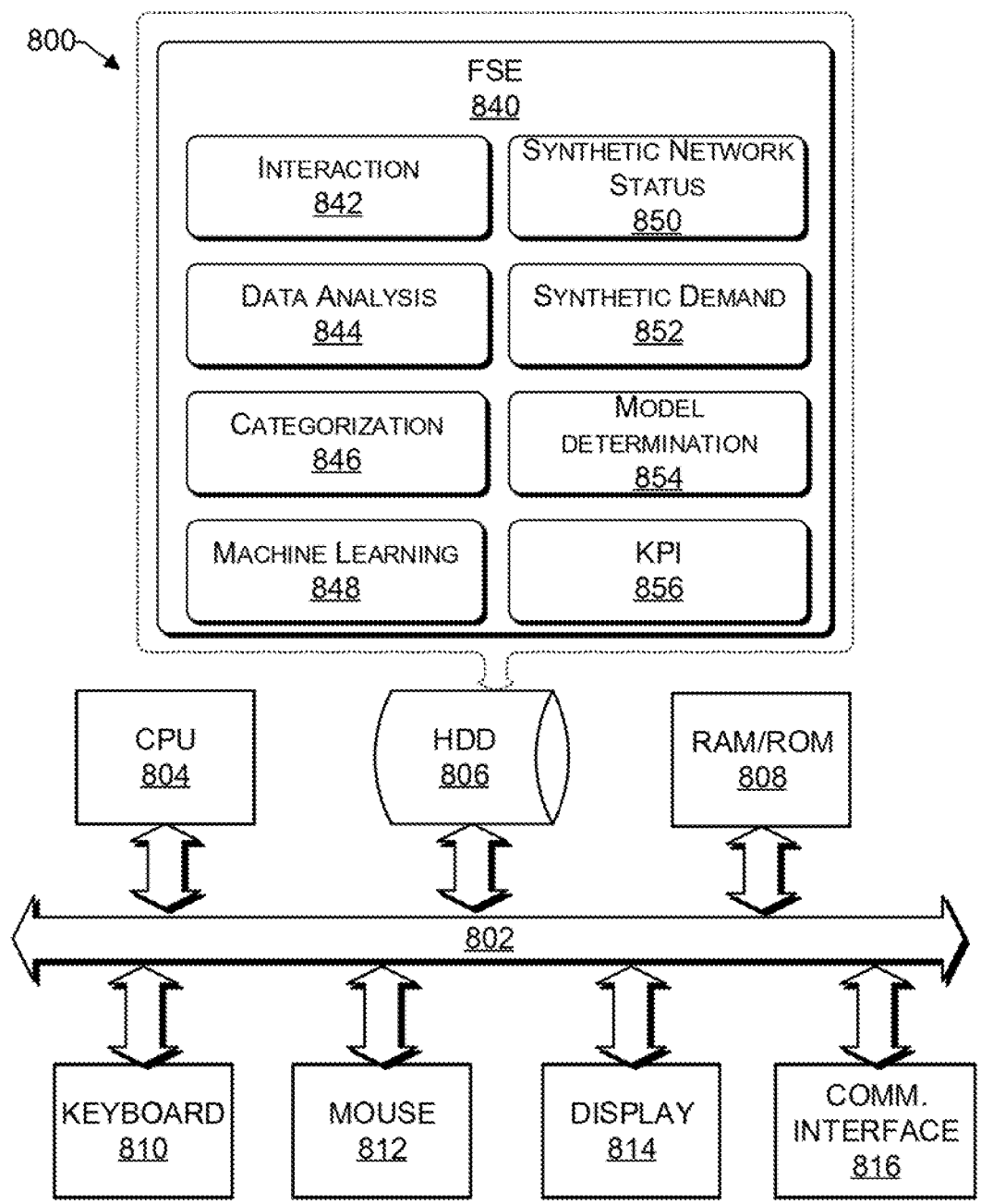
FIG. 8 provides a functional block diagram illustration of a computer hardware platform that may be used to implement the functionality of the optimization server of FIG. 1

As discussed above, functions relating to implementing a system for modeling a fulfillment strategy and determining its KPIs, can be performed with the use of one or more computing devices connected for data communication via wireless or wired communication, as shown in FIG. 1 and in accordance with the processes of FIGS. 6 and 7. FIG. 8 provides a functional block diagram illustration of a computer hardware platform 800 that may be used to implement the functionality of the optimization server 130 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 808, has capabilities that include storing a program that can execute various processes, such as fulfillment strategy engine (FSE) 840, in a manner described herein. The FSE 840 may have various modules configured to perform different functions to identify KPIs under different scenarios.

For example, there may be an interaction module 842 that is operative to receive electronic data from various sources, including historical data 115 from the order repository 114, input parameters from a user device 142, business rules 113 from a business rules database 112, and/or other data that may be in the cloud 120.

In one embodiment, there is a data analysis module 844 operative to determine a demand status and a network status of various historic scenarios. There may be a categorization module 846 that is operative to place raw order data into one or more appropriate order categories. The categorization module 846 can also place raw node data into one or more appropriate one or more fulfillment categories.

In one embodiment, there is a machine learning module 848 operative to learn from the historical data 115 to develop a synthetic scenario. There may be a synthetic network status module 850 that is operative to characterize a synthetic network status based on the raw network status information and user input parameters. Similarly, there may be a synthetic demand module 852 operative to characterize a synthetic demand status based on the raw demand data and user input parameters.

In one embodiment, there is a model determination block 854 operative to determine whether (i) a linear model, (ii) a logistic regression model, or (iii) a neural network model should be used for the determination of the KPIs for an identified fulfillment strategy.

In one embodiment, there is a KPI module 856 operative to calculate the KPIs of a synthetic scenario. The KPIs can be calculated with respect to the synthetic demand status and/or the synthetic network status 216.

In one example a program, such as Apache™, can be stored for operating the system as a Web server. In one embodiment, the HDD 808 can store an executing application that includes one or more library software modules, such as those for the Java™ Runtime Environment program for realizing a JVM (Java™ virtual machine).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device having a memory stack configured to store raw data and for content and programming, coupled to the processor; and
a fulfilment strategy program stored in the storage device, wherein an execution of the program by the processor configures the computing device to perform acts comprising:
receiving input parameters from a computing device of a user that is stored in the memory stack;
receiving historical data related to a network of nodes from a data repository that is stored in the memory stack as part of the raw data;
reducing a computational load and increasing an accuracy of the processor by soliciting constraints from the computing device of the user that reduce a volume of the historical data stored in the memory stack, to samples that are deemed to be relevant for calculations processed by the processor;
determining a synthetic demand status based on the reduced volume of historical data and the input parameters;
determining a synthetic network status based on the reduced volume of historical data and the input parameters;
identifying a fulfilment strategy based on the synthetic demand status and the synthetic network status;
increasing the accuracy in a machine learning model to determine how one or more factors influence the identified fulfilment strategy, by training the machine learning model by not only using the historical data, but also the synthetic demand status and the synthetic network status;
adjusting the machine learning model to achieve a least computationally complex model on the processor that meets a predetermined threshold level of accuracy, wherein the adjusting includes a least absolute shrinkage and selection operator (lasso) to automatically analyze a correlation between fulfilment parameters of the machine learning model by performing both variable selection and regularization in order to enhance a prediction accuracy and interpretability of the resulting adjusted machine learning model; and
determining key performance indicators (KPIs) for the fulfilment strategy based on the synthetic demand status and the synthetic network status, wherein:
the historical data includes data describing one or more orders; and
determining the synthetic demand status comprises, for each order in the historical data:
categorizing the order into one or more predetermined order categories;
identifying one or more order categories that most closely coincide with one or more input parameters of the one or more input parameters that relate to demand data; and
generating synthetic demand data based on the identified one or more order categories and the one or more input parameters that relate to demand data.

2. The computing device of claim 1, wherein:
the historical data includes:
raw demand data of one or more products offered by the network of nodes; and
raw node data of each node in the network of nodes;
the synthetic demand status is based on the raw demand data; and
the synthetic network status is based on the raw node data.

3. The computing device of claim 2, wherein the input parameters comprise:
one or more parameters that are related to a demand of one or more products in the network of nodes; and
one or more parameters that are related to a status of the network of nodes.

4. The computing device of claim 2, wherein the input parameters are received iteratively by way of interactive communication between the computing device and the computing device of the user.

5. The computing device of claim 2, wherein the raw node data of each node in the network of nodes and a raw demand data of the orders are received in separate data packets from the data repository.

6. The computing device of claim 2, wherein the demand data includes, for each order in a predetermined period, at least one of: an order number, an order line number, a stock keeping unit (SKU) number, an order creation time, an order process time, a source location, a destination location, a fulfilment node, a unit number, a carrier mode, a shipping cost, and a service level agreement (SLA) identification.

7. The computing device of claim 1, wherein:
the historical data includes one or more fulfilment information; and
determining the synthetic network status comprises, for each fulfilment information in the historical data:
categorizing the fulfilment information into one or more predetermined fulfilment categories;
identifying one or more fulfilment categories that most closely coincide with one or more input parameters of the input parameters that relate to fulfilment data; and
generating synthetic network data based on the identified one or more fulfilment categories and the one or more input parameters that relate to the fulfilment data.

8. The computing device of claim 2, wherein generating the synthetic demand data comprises using machine learning to learn from the raw demand data of the historical data.

9. The computing device of claim 7, wherein generating the synthetic network data comprises using machine learning to learn from a raw node data.

10. The computing device of claim 1, wherein the KPIs that are based on the synthetic network status include at least one of: a number of packages per order, a cost per package, a number of end of day (EOD) backlog days, average cost per order-line, average package per order-line, a number of upgraded orders, and a number of delayed orders.

11. The computing device of claim 1, wherein determining the KPIs for the fulfilment strategy comprises:
applying a linear model to determine KPIs of the fulfilment strategy;
upon determining that an R-squared score of the linear model is not above a predetermined first threshold, applying a logistic regression model to determine the KPIs of the fulfilment strategy; and
upon determining that an R-squared score of the logistic regression model is below a predetermined second threshold, applying a neural network model to determine the KPIs of the fulfilment strategy.

12. A non-transitory computer readable storage medium tangibly embodying a computer readable program code having computer readable instructions that, when executed, cause a computer device to carry out a method of evaluating a fulfilment strategy in an omnichannel distribution system, the method comprising:
receiving input parameters from a computing device of a user that is stored in a memory stack of a computing device;
receiving historical data related to a network of nodes from a data repository that is stored in the memory stack as a raw data;
reducing a computational load and increasing an accuracy of a processor by soliciting constraints from the computing device of the user that reduce a volume of the historical data stored in the memory stack, to samples that are deemed to be relevant for calculations processed by the processor;
determining a synthetic demand status based on the reduced volume of historical data and the input parameters;
determining a synthetic network status based on the reduced volume of historical data and the input parameters;
identifying a fulfilment strategy based on the synthetic demand status and the synthetic network status;
increasing the accuracy in a machine learning model to determine how one or more factors influence the identified fulfilment strategy, by training the machine learning model by not only using the historical data, but also the synthetic demand status and the synthetic network status;
adjusting the machine learning model to achieve a least computationally complex model on the processor that meets a predetermined threshold level of accuracy, wherein the adjusting includes a least absolute shrinkage and selection operator (lasso) to automatically analyze a correlation between fulfilment parameters of the machine learning model by performing both variable selection and regularization in order to enhance a prediction accuracy and interpretability of the resulting adjusted machine learning model; and
determining key performance indicators (KPIs) for the fulfilment strategy based on the synthetic demand status and the synthetic network status, wherein:
the historical data includes data describing one or more orders; and
determining the synthetic demand status comprises, for each order in the historical data:
categorizing the order into one or more predetermined order categories;
identifying one or more order categories that most closely coincide with one or more input parameters of the one or more input parameters that relate to demand data; and
generating synthetic demand data based on the identified one or more order categories and the one or more input parameters that relate to demand data.

13. The non-transitory computer readable storage medium of claim 12, wherein:
the historical data includes:
raw demand data of one or more products offered by the network of nodes; and
raw node data of each node in the network of nodes;
the synthetic demand status is based on the raw demand data; and
the synthetic network status is based on the raw node data.

14. The non-transitory computer readable storage medium of claim 13, wherein the input parameters comprise:
one or more parameters that are related to a demand of one or more products in the network of nodes; and
one or more parameters that are related to a status of the network of nodes.

15. The non-transitory computer readable storage medium of claim 13, wherein the input parameters are received iteratively by way of interactive communication between the computing device and the computing device of the user.

16. The non-transitory computer readable storage medium of claim 13, wherein the raw node data of each node in the network of nodes and the raw demand data of the orders are received in separate data packets from the data repository.

17. The non-transitory computer readable storage medium of claim 12, wherein determining the synthetic network status comprises, for each fulfilment information in the historical data:
categorizing the fulfilment information into one or more predetermined fulfilment categories;

identifying one or more fulfilment categories that most closely coincide with one or more input parameters of the input parameters that relate to fulfilment data; and generating synthetic network data based on the identified one or more fulfilment categories and the input parameters that relate to the fulfilment data.

18. The non-transitory computer readable storage medium of claim 12, wherein determining the KPIs for the fulfilment strategy comprises:

applying a linear model to determine KPIs of the fulfilment strategy;

upon determining that an R-squared score of the linear model is not above a predetermined first threshold, applying a logistic regression model to determine the KPIs of the fulfilment strategy; and upon determining that an R-squared score of the logistic regression model is below a predetermined second threshold, applying a neural network model to determine the KPIs of the fulfilment strategy.

* * * * *